United States Patent [19]
Pauley

[11] 3,886,822
[45] June 3, 1975

[54] POWER WRENCH WITH ROTATIVELY MOUNTED MOTOR
[75] Inventor: Reginald W. Pauley, Belle Mead, N.J.
[73] Assignee: Ingersoll-Rand Company, Woodcliff Lake, N.J.
[22] Filed: Apr. 22, 1974
[21] Appl. No.: 462,597

Related U.S. Application Data
[63] Continuation of Ser. No. 325,390, Jan. 22, 1973, abandoned.

[52] U.S. Cl................ 81/52.4 R; 81/57.11; 173/52
[51] Int. Cl. .................................................... B25b
[58] Field of Search......... 81/57.11, 52.4 R; 173/12, 173/52

[56] References Cited
UNITED STATES PATENTS
| | | | |
|---|---|---|---|
| 3,082,742 | 3/1963 | Vilerding et al. | 81/52.4 R |
| 3,169,585 | 2/1965 | Maurer | 173/93 |
| 3,322,205 | 5/1967 | Amtsberg et al. | 173/52 X |

Primary Examiner—James L. Jones, Jr.
Attorney, Agent, or Firm—David W. Tibbott; Walter C. Vliet

[57] ABSTRACT

A power wrench having its motor rotor driving a spindle adapted to be connected to a fastener or nut. The motor housing itself is rotatively mounted in the wrench body and rotation therein is controlled by means of a fluid friction clutch or another motor. The motor housing rotates slowly and continuously in a direction opposite that of the rotor of the motor causing the cyclic peak output torque of the motor to be repeatedly applied to the fastener resulting in a more uniform final torqueing of the fastener. Where a second motor is utilized to control the motor housing rotation it may also drive the motor housing in the same direction as the motor rotor resulting in two speed operation and finally the repeated application of the overriding torque of the motor which is higher normally than the peak output torque mentioned above.

12 Claims, 6 Drawing Figures

PATENTED JUN 3 1975 3,886,822

SHEET 2

POWER WRENCH WITH ROTATIVELY MOUNTED MOTOR

BACKGROUND OF THE INVENTION

A conventional type of power wrench has an air or electric motor that drives a reduction gear set and socket. The final torque applied to the fastener is dependent on the variations in the stall torque of the motor. In addition, when used in multiples this conventional type of power wrench produces an even greater variation in the final torque as some fasteners stop rotating and fail to move again when adjacent fasteners are "pulled up" due to high friction.

SUMMARY OF INVENTION

The prinicpal object of this invention is to overcome the disadvantages of the prior art by providing a power wrench which repeatedly applies a maximum value of torque close to or greater than it stall torque without relative motion between the rotor and motor housing being stopped.

Other important objects are to provide a compact tool suitable for individual or multiple use offering a minimum of rotating mass reacting on the fastener when it stops and avoids driving the fastener through a high speed or high torque slip clutch arrangement.

In general, the invention contemplates a power wrench wherein the motor is rotatively mounted within the wrench body and rotation is controlled by a means that will allow some rotation but provide increased resistance to that rotation with an increase in the number of revolutions per minute or in the alternative a slow fixed rate of rotation. This rotation of the motor relative to its rotor causes the cyclic peak output torque of the motor to be repeatedly applied to the fastener resulting in a more uniform final torqueing of the fastener.

More specifically these objects are obtained in a power wrench comprising: a wrench body; a rotary motor housing rotatively mounted within said wrench body; a motor rotor rotatively mounted in said motor housing; a spindle connected to said motor rotor to be driven thereby, said spindle being adapted to be connected to a fastener for driving the fastener, and means for allowing controlled rotation of said motor housing within said wrench body.

DESCRIPTION OF PREFERRED EMBODIMENT

Figure 1:
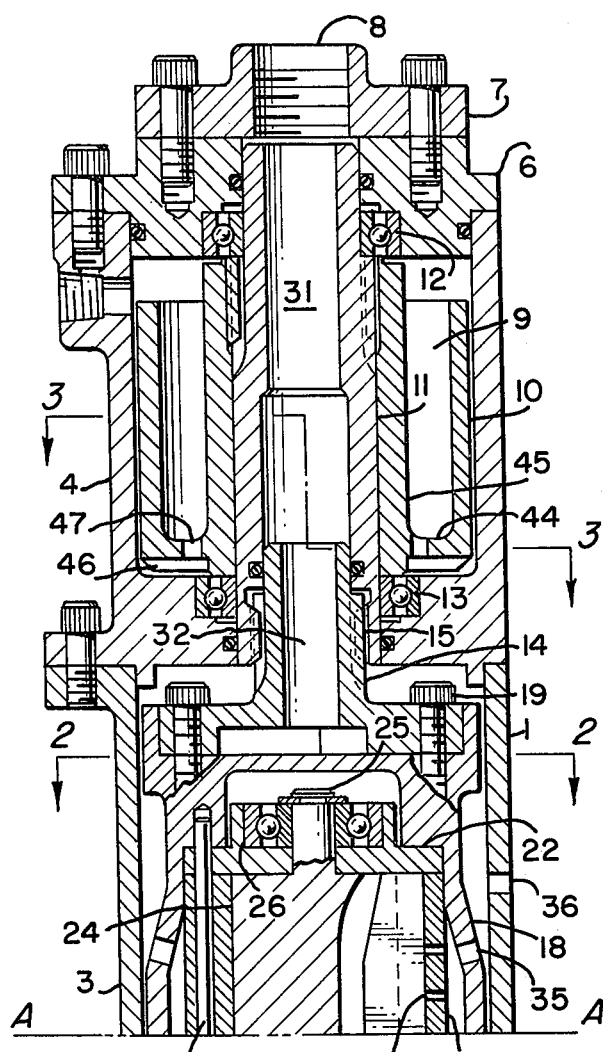
FIG. 1 and FIG. 1A are elevational views, having portions broken away and shown in section for a power wrench illustrating an embodiment of this invention.
Figure 1A:
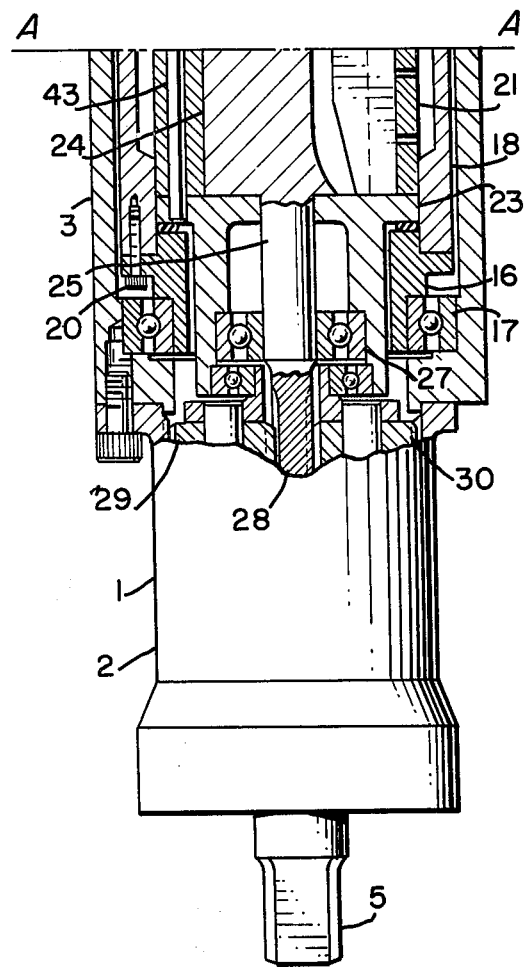
Figure 2:
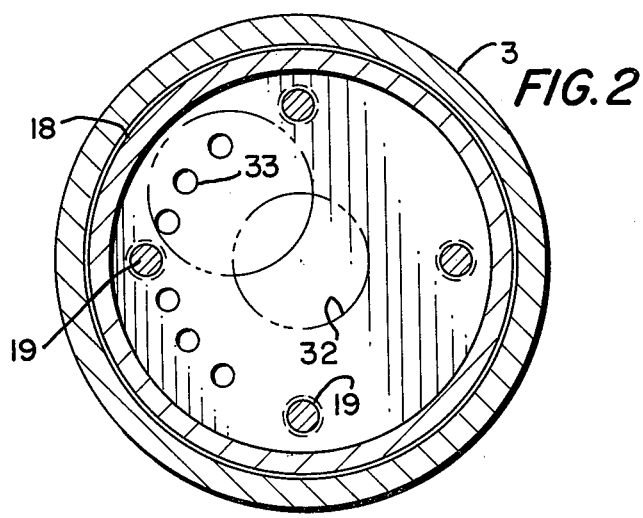
FIG. 2 is a section taken on line 2—2 of FIG. 1.
Figure 3:
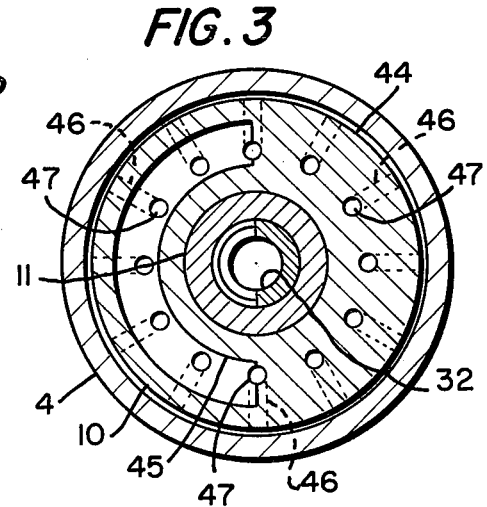
FIG. 3 is a section taken along line 3—3 of FIG. 1

The power wrench I includes a wrench body consisting of three bolted together casings; gear casing 2, motor casing 3, and clutch casing 4. A fastener driving spindle 5 adapted to receive a nut driving socket not shown projects from the gear casing 2. The end of the clutch casing 3 is closed by seal plate 6 to which is bolted end plate 7 which is adapted to receive an air hose fitting (not shown) at inlet port 8.

Fluid shear clutch 9 consists of two concentric cylindrical members 10 and 45 joined at one end by a radial vane member 44. Radial vane member 44 has vanes 46 and fluid ports 47 drilled through a promote fluid circulation. Cylindrical face member 45 is mounted on and keyed to clutch shaft 11. Clutch shaft 11 is mounted in bearings 12 and 13, which allow the shaft and face member to rotate. Clutch shaft 11 engages rear motor spindle 14 through spline 15. Rear motor spindle 14 together with forward motor spindle 16, which is mounted in bearing 17, position motor housing 18 in the motor casing and allows it to rotate. Spindles 14 and 16 are bolted to motor housing 18 by bolts shown at 19 and 20 respectively. Rotor cylinder 21 and rotor end caps 22 and 23 are aligned and prevented from relative rotation in motor housing 18 by means of dowel pins 43. Except for the provision to allow motor housing 18 to rotate and provide a rotary air inlet it is otherwise a conventional compressed gas vane type motor.

Rotor 24 is mounted on rotor shaft 25 in the rotor end caps 22 and 23 by bearings 26 and 27 respectively. Rotor shaft 25 terminates in a gear at 28 which drives gear reducer gears 29 and 30 partially shown. The gear reducer is of conventional design with output on fastener driving spindle 5.

Air enters the motor via inlet port 8 and is conducted to the rotor cylinder 21 via passageways 31, 32 and 33 respectively. Air exhausts the rotor cylinder 21 via ports 34, 35 and 36 respectively.

In operation, air entering rotor cylinder 21 is expanded against axial vanes to cause the rotor to turn and in turn the rotor drives rotor shaft 25 and hence fastener driving spindle 5 through the gear reducer. An equal and opposite reaction force tends to turn the rotor cylinder 21 and hence the motor housing 18 in the opposite direction of the rotor. Since the motor housing 18 is free to rotate as described above, it tends to drive shaft 11 via spindle 14 and spline 15 in a direction opposite the rotor 24. This, in turn, causes the cylindrical face member 10 to rotate relative to the cylindrical inner face of the clutch casing 4 causing a shearing of the viscous fluid contained in the clutch casing 4 and between the two faces. The shearing action resiliently resists the rotation of the cylindrical face member 10 and therefore via shaft 11, spline 15 and spindle 14, the rotation of the motor housing 18.

It should be understood that the fluid shear clutch may be replaced by any other means for actively or passively restraining the motor housing 18. For example a low speed high torque motor may be used to drive the motor housing slowly in a direction opposite the rotor. A second motor might also be utilized as the controlling means to give a two speed operation by driving forward during run down and reversing for the final torquing operation. In the alternative the second motor would continue to drive forward causing the cyclic overriding torque of the motor to be applied to the fastener. This torque is normally considerably higher than the peak output torque of the vane motor.

Figure 4:
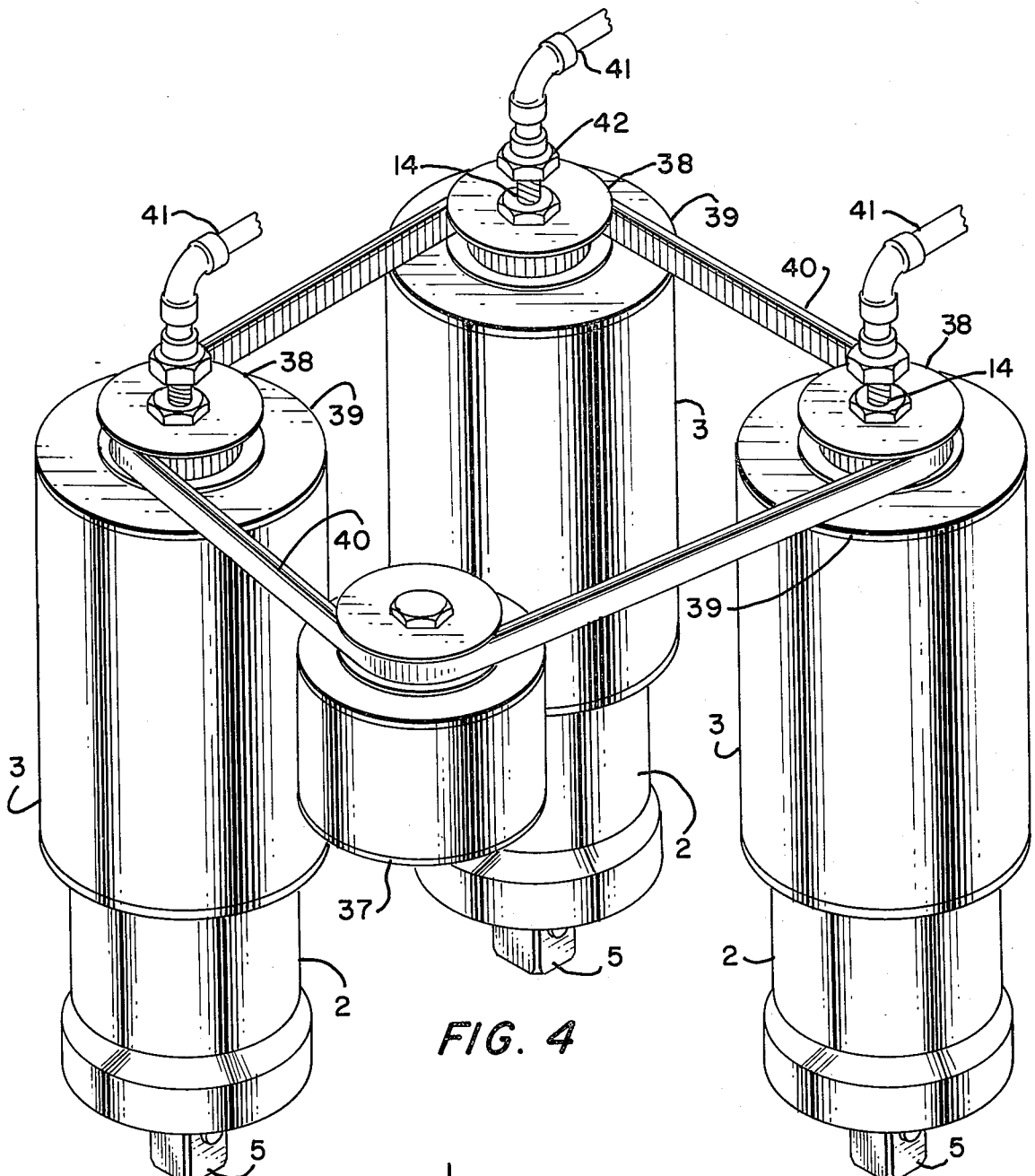
FIG. 4 is a perspective view of an arrangement of three power wrenches with a single restraining device coupled by means of a cog belt.

In an alternate embodiment of the invention shown in FIG. 4, the spindle 14 is terminated external to the motor casing 3 in a pulley 38 or other suitable means for transmitting reaction torque of the motor. Motor casing 3 is provided with a suitable end plate 39 containing a seal and bearing for this purpose. A rotary air coupling 42 is required between the supply pipe 41 and spindle 14. The restraining means 37 may be active such as a low speed motor or passive such as a fluid shear clutch and may be coupled by any power transmission means, for example a cog belt 40 as shown. It should be observed that the restraining means can handle one or more units although three units are shown.

Figure 5:
FIG. 5 shows the final output torque condition with a stalled spindle.

As each rotor vane passes the inlet port, there is an increase of torque output creating pulses of a cylical nature with n pulses per revolution for a rotor with n blades. The motor may stall at different levels due to this cyclical torque output. By allowing the motor to slowly rotate at speeds of one-tenth of less of free motor speed in a direction opposite the rotor, it is possible to repeatedly apply to the spindle even after its rotation has stopped the nearly maximum torque pulse proportional in magnitude to the inlet pressure of air to the motor. This is shown graphically in FIG. 5. In this manner, a more nearly uniform maximum torque can be developed in the fastener and the problems of high static friction associated with the restart of the air motor and fastener are avoided.

Although the preferred embodiments of the invention have been shown and described, it should be understood that the invention is not limited thereto, except by the scope of the claims. Various modification and changes can be made without departing from the scope and spirit of the invention as the same will now be understood by those skilled in the art.

I claim:

1. A power wrench comprising:
A wrench body; a rotary motor housing rotatively mounted in said wrench body; a motor rotor rotatively mounted in said motor housing for plural revolutions therein; a spindle connected to said motor rotor to be driven thereby, said spindle being adapted to be connected to a fastener for driving the fastener, means for controlling the rotation of said motor housing relative to said spindle in order for said spindle to drive a fastener, said means allowing said motor housing to rotate relative to said spindle when said spindle is stalled and applying a torque to a fastener to cause such torque to pulsate in value.

2. A power wrench according to claim 1 wherein said rotary motor is of a pulsating torque output type.

3. A power wrench according to claim 1 wherein said rotary motor is a vane type compressed fluid operated motor.

4. A power wrench according to claim 2 wherein said means for controlling the rotation of said motor comprises a passive means increasingly restraintive with increased rotating speed.

5. A power wrench according to claim 4 wherein said passive means of allowing controlled rotation of said motor housing comprises a fluid shear type of clutch.

6. A power wrench according to claim 5 wherein said clutch is mounted within said body and transmits the reactive motor housing torque to said wrench body.

7. A power wrench according to claim 1 wherein said means for allowing controlled rotation comprises a motor, said motor may drive in either direction.

8. A power wrench according to claim 2 wherein said means for controlling the rotation of said motor housing is external of said wrench body said means being passive in restraint.

9. A power wrench according to claim 2 wherein said means for controlling the rotation of said motor housing is external of said wrench body said means comprises a motor, said motor arranged to drive in either direction.

10. Combination of plurality of power wrenches according to claim 8 wherein said means for controlling the rotation of said motor housing is a single means arranged to handle a plurality of power wrenches.

11. Combination of a plurality of power wrenches according to claim 9 wherein said means for controlling the rotation of said motor housing is a single means arranged to handle a plurality of power wrenches.

12. A power wrench comprising a wrench body; a rotary vane type air motor rotatively mounted within said wrench body, said motor receiving air axially through its rotary mounting shaft; a spindle connected to said motor to be driven thereby, said spindle being adapted to be connected to a fastener with suitable gear reduction for driving the fastener; and a means for allowing controlled rotation of said motor within said wrench body, said means comprising a fluid shear clutch being axially aligned with said wrench body, said air motor, said spindle, and gear reducer and being connected between said motor and said wrench body to transmit reactive torque from said motor to said wrench body.

* * * * *